(12) United States Patent
Keating et al.

(10) Patent No.: US 7,348,991 B1
(45) Date of Patent: Mar. 25, 2008

(54) VIDEO/GRAPHICS TEXT MODE ENHANCEMENT METHOD FOR DIGITALLY PROCESSED DATA

(75) Inventors: Stephen J. Keating, Sunnyvale, CA (US); Duane P. Siemens, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 10/417,712

(22) Filed: Apr. 16, 2003

(51) Int. Cl.
*G09G 5/02* (2006.01)

(52) U.S. Cl. ............... 345/589; 345/468; 345/469; 345/469.1; 345/470; 345/472.2; 345/611; 345/612; 382/260; 382/263; 382/264; 382/269; 382/274; 382/275; 382/298; 382/299; 382/301

(58) Field of Classification Search ............ 345/89, 345/589–605, 615, 467–472, 472.2, 612; 382/269, 169, 274–275
See application file for complete search history.

(56) References Cited

U.S. PATENT DOCUMENTS

| | | | | |
|---|---|---|---|---|
| 4,755,954 | A * | 7/1988 | Netter ........................ | 345/596 |
| 5,285,271 | A * | 2/1994 | Gennetten .................. | 358/500 |
| 5,712,799 | A * | 1/1998 | Farmwald et al. .......... | 345/475 |
| 5,907,665 | A * | 5/1999 | Sobol et al. ................ | 358/1.9 |
| 6,208,763 | B1 * | 3/2001 | Avinash ...................... | 382/254 |
| 6,227,725 | B1 * | 5/2001 | Ancin et al. ................ | 358/1.9 |
| 6,240,217 | B1 * | 5/2001 | Ercan et al. ................ | 382/274 |
| 6,282,327 | B1 * | 8/2001 | Betrisey et al. ............. | 382/299 |
| 6,339,426 | B1 * | 1/2002 | Lui et al. .................... | 345/467 |
| 6,384,828 | B1 * | 5/2002 | Arbeiter et al. ............ | 345/472.2 |
| 6,535,648 | B1 * | 3/2003 | Acharya ..................... | 382/274 |
| 6,603,482 | B1 * | 8/2003 | Tidwell ...................... | 345/592 |
| 7,173,660 | B2 * | 2/2007 | Toji et al. .................. | 348/333.02 |
| 2002/0154810 | A1 * | 10/2002 | Hakim et al. .............. | 382/149 |

* cited by examiner

*Primary Examiner*—Kee M. Tung
*Assistant Examiner*—Antonio A Caschera
(74) *Attorney, Agent, or Firm*—Blakely Sokoloff Taylor & Zafman

(57) ABSTRACT

A text enhancement unit is introduced in order to alleviate the degradation of text characters on computer or television displays. The text enhancement unit uses an enhancement process to regain uniformity and intensity that may be lost during image processing. The text enhancer unit may be placed between an image processing unit such as a scaler, de-interlacer, or DSP, and a computer or television display to improve the quality of text characters that may have become degraded by image processing performed by the image processing unit. In one embodiment, the text enhancer unit improves contrast by multiplying pixel intensity by an intensity multiplier. In a second embodiment, the text enhancer unit improves contrast using a threshold operation which outputs either a very high or very low intensity pixel. In an third embodiment, the text enhancer unit improves contrast using a threshold operation which outputs either a very low intensity pixel or a pixel multiplied by an intensity multiplier. In a fourth embodiment, the text enhancer unit improves contrast using a threshold operation which outputs either an unchanged pixel or a pixel multiplied by an intensity multiplier. In a fifth embodiment, the text enhancer unit improves contrast using a dual threshold operation which outputs either a very low intensity pixel, a very high intensity pixel, or an unchanged pixel.

31 Claims, 10 Drawing Sheets

Figure 1 – Prior Art

C:\WINDOWS>
Digital Graphical Text Data

→ Scaler or De-Interlacer or DSP 120

→ Display Computer or Television 150

C:\WINDOWS>
Processed Digital Graphical Text Data

VIDEO/GRAPHICS TEXT MODE ENHANCEMENT METHOD FOR DIGITALLY PROCESSED DATA

FIELD OF THE INVENTION

The present invention relates to the field of digital image display and processing. In particular the present invention discloses a system for rendering high-quality characters and graphics on personal computers and televisions.

BACKGROUND OF THE INVENTION

People are receiving more and more of information from computers than ever before. With the advent of the worldwide web (WWW), many people receive news, entertainment, and business information from a plethora of web sites that provide limitless amounts of information from an infinite number of viewpoints. Though the amount of graphical and audio data is ever increasing, simple text remains one of the most important means of providing information to users.

Text information is provided to information consumers on many different electronic display systems. Common electronic display systems used includes Cathode Ray Tube (CRT) based computer monitors, flat panel computer monitors, small cellular telephone displays, Personal Digital Assistant (PDA) displays, analog television sets, and digital television sets.

The graphical image data containing text information is often processed before being displayed on the end display system. When a graphical image containing text information is processed certain information may be lost or transformed in such a manner that the text information in the graphical image may become degraded. The degraded text information may become difficult or even impossible to read by the end user. To prevent such text information loss, a text enhancement system would be desirable. The text enhancement system would ideally change the graphical image such that the text information appears clear and easily legible.

SUMMARY OF THE INVENTION

The present invention introduces a text enhancement unit to alleviate the degradation of text characters on computer or television displays. The text enhancement unit of the present invention uses an enhancement process to regain uniformity and intensity that may be lost during image processing. The text enhancer unit may be placed between an image processing unit such as a scaler, de-interlacer, or DSP, and a computer or television display to improve the quality of text characters that may have become degraded by image processing performed by the image processing unit.

In one embodiment, the text enhancer unit improves contrast by multiplying pixel intensity by an intensity multiplier. In a second embodiment, the text enhancer unit improves contrast using a threshold operation that outputs either a very high intensity or very low intensity pixel. In a third embodiment, the text enhancer unit improves contrast using a threshold operation that outputs a very low intensity pixel, a very high intensity pixel, or a pixel multiplied by an intensity multiplier. In a fourth embodiment, the text enhancer unit improves contrast using a threshold operation which outputs either an unchanged pixel or an input pixel multiplied by an intensity multiplier. In a fifth embodiment, the text enhancer unit improves contrast using a dual threshold operation which outputs either a very low intensity pixel, a very high intensity pixel, or an unchanged pixel. In a sixth embodiment, the text enhancer unit improves contrast by outputting very low intensity output pixel for an input pixel below a low intensity threshold, outputting a very high intensity output pixel for an input pixel above a high intensity threshold, and outputting a pixel with a discrete intensity value for an input pixel with an intensity above said low intensity threshold and below said high intensity threshold.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which:

FIG. 1 illustrates a block diagram of a digital processing unit such as a scaler, de-interlacer, or DSP that reduces the quality of text before it is displayed on a computer or television display.

DETAILED DESCRIPTION OF THE PREFERRED EMBODIMENT

A method and apparatus for enhancing the display of text on video displays is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to displaying text on television sets. However, the same techniques can easily be applied to displaying text on other types of electronic display systems.

Text Degradation from Image Reformatting

In computer and television graphics, many different modes are used to display text information to a user. One of the most commonly used methods is to display text as high-contrast black font characters on a white background (similar to black text on a white sheet of paper) or as high-contrast white font characters on black background (similar to white chalk writing on a blackboard). Most computer display systems create the font characters using of rows and columns of video pixels which approximate, to a viewer, a text character.

In computer and television display systems images are often reformatted for reasons of source to display compatibility. FIG. 1 illustrates a block diagram of an arrangement for performing such a reformatting. Referring to FIG. 1, a digital processing unit 120 such as a scaler, de-interlacer, or DSP reformats incoming digital graphical text data before it is displayed on a computer or television display 150. Due to this image reformatting; some information may be lost during the reformatting process. The types of image reformatting may include digital filtering or digital image resizing (scaling).

The information loss during the reformatting process may produce image quality losses in perceived uniformity and intensity; depending on image reformatting and display methods. Inherent in digital scaling and other Digital Signal Processing methods is the processing of data points against neighboring points. For some types of image data with great coherency; such as movies and photographs, this image processing generally produces little or no perceived loss in image quality. However, when such image processing techniques are applied to images containing text, often the result is that the text becomes fainter and non uniform.

Figures 2A, 2B, 2C:
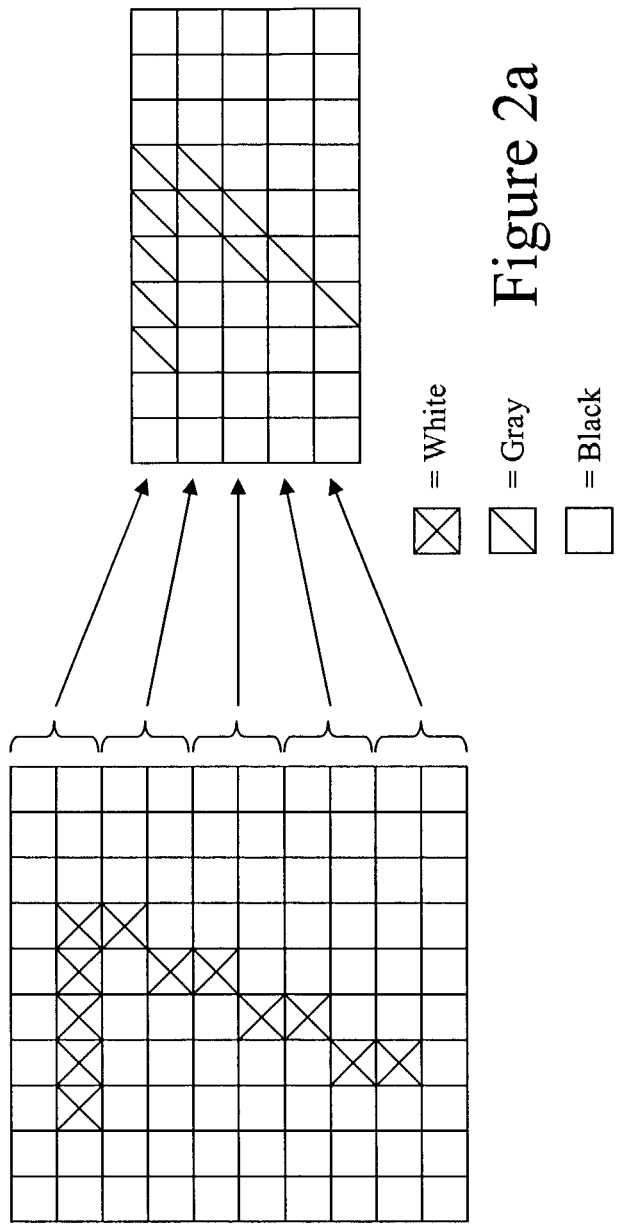
FIG. 2A illustrates how a vertical scaling operation may reduce the visual quality of a text character.
FIG. 2B illustrates how a short text string may appear before a scaling operation.
FIG. 2C illustrates how the short text string of FIG. 2B may appear after a scaling operation that reduces the text quality.

FIG. 2A graphically illustrates how a vertical scaling operation may cause a text character to become fainter. On the left side of FIG. 2A, a pixel matrix containing a representation of the character "7" is illustrated. The "7" character is created by an arrangement of white pixels (marked with an "X" in the pixel location) forming the "7" character on a black background (marked with empty pixel locations). In a vertical scaling operation that reduces the vertical dimension of the image by one half, every two rows of pixels are combined into a single pixel row. The combining of pixel rows may be performed by averaging together the vertically adjacent pixels. The right side of FIG. 2A illustrates how the "7" character may appear after a vertical scaling operation that averages together the pixel rows. As illustrated on the right side of FIG. 2A, the "7" character is now constructed of a set of gray pixels (marked with a "/" in the pixel location) forming the "7" character on a black background (marked with empty pixel locations). Thus, the averaging of white (character pixels) with black (background) pixels caused a fainter (gray) character to be output.

FIGS. 2B and 2C illustrate this effect. Specifically, FIG. 2B illustrates the string "C:\WINDOWS" as a bright white text string on a black background. However, FIG. 2C illustrates how the string "C:\WINDOWS" may appear as a fainter gray text string on a black background after a scaling operation. Note the non-uniformity and diminished intensity of the gray text string in FIG. 2C.

Text Enhancement Unit

To alleviate the degradation of text characters in computer or television displays, the present invention introduces a text enhancement unit. The text enhancement unit of the present invention uses an enhancement process to regain uniformity and intensity that may be lost during image processing.

Figure 3:
FIG. 3 illustrates the arrangement of FIG. 1 wherein a text enhancer unit processes the output from the scaler, de-interlacer, or DSP in order to mitigate the text quality problem before a final output is displayed on a computer or television display.

FIG. 3 illustrates a block diagram of one implementation of the text enhancement system of the present invention. In the embodiment of FIG. 3, a text enhancer unit 330 has been placed between an image processing unit 320 such as a scaler, de-interlacer, or DSP, and a computer or television display 350. The goal of the text enhancer unit 330 is to improve the quality of text characters that may have become degraded by image processing performed by the image processing unit 320. Specifically, the high-quality digital graphical text data 315 received by the image processing unit 320 may become degraded as illustrated by the processed digital graphical text data 325. Thus, the text enhancer unit 330 enhances the degraded text to create the enhanced digital graphical text data 355 that will be displayed as the final output on the computer or television display 350.

Text Enhancement Operation

To mitigate the effects of text degradation, the text enhancement unit may attempt to brighten pixels associated with text characters. In one embodiment, this is performed by transforming pixels dependent upon their intensity. Specifically, a set of darkened pixels that may be associated with text are brightened to improve the contrast between the text and the background on the display screen.

Prior text enhancement systems used complex sharpening algorithms. When such sharpening algorithms were implemented, the sharpening algorithms often required frequency domain transformations. Frequency domain transformations require significant amounts of storage and processing power to manipulate the data. Furthermore, many of the prior systems were primarily focused on printer artifacts and not display screen artifacts. Finally, many of the prior systems employed edge sharpening algorithms that only somewhat increased intensity, but did not improve the uniformity of the text information. The systems of the present invention have been designed to remedy such shortfalls.

Figure 4:
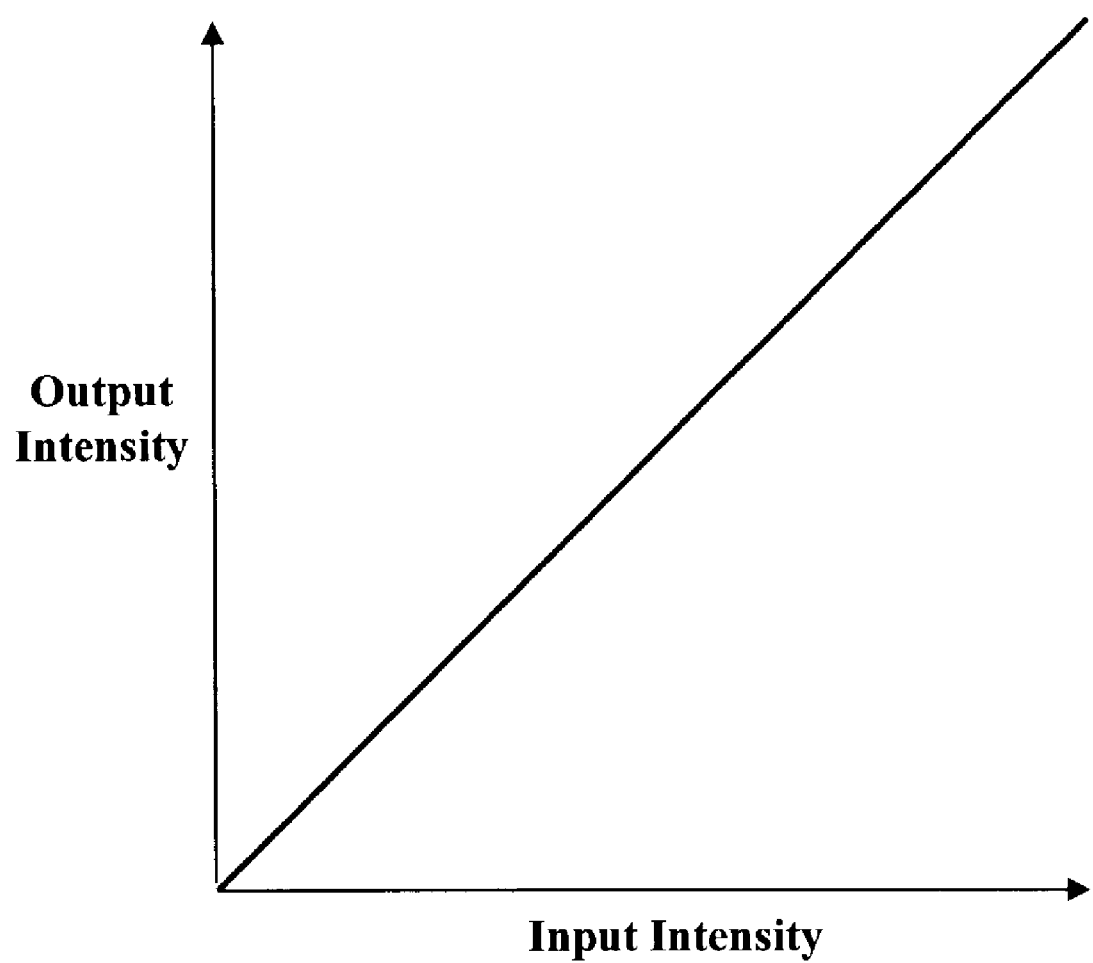
FIG. 4 graphically illustrates an identity transform that outputs each input pixel unchanged.

To illustrate various different pixel transformations, a pixel intensity transformation graph will be used. For example, FIG. 4 graphically illustrates an identity transform for pixel intensity. The pixel intensity identity transform outputs each input pixel as unchanged. Specifically, each input pixel with an intensity found along the horizontal axis is output as a pixel having the same intensity along the vertical axis. Variations on the input/output pixel intensity graph of FIG. 4 will be used to describe various implementations of the present invention.

Intensity Multiplication Implementation

In a first embodiment, a pixel intensity multiplication is performed to increase the intensity of the pixels (to a limited minimum or maximum intensity, i.e. minimum>=output intensity<=maximum). The basic invention can use a fixed intensity multiplier or a user-defined (programmable) intensity multiplier to transform the pixels in order to enhance the image data.

Figure 5A:
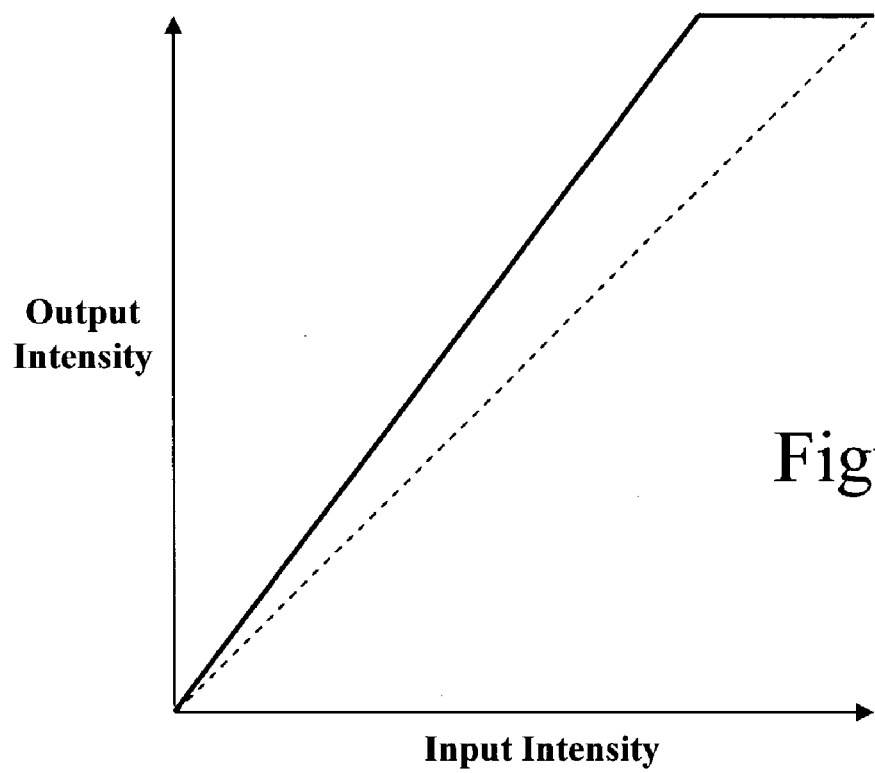
FIG. 5A illustrates a first example of a first embodiment that outputs an output pixel having linearly proportional intensity for each input pixel.

FIG. 5A illustrates a first example of this pixel intensity multiplication plotted on a graph of input pixel intensity versus output pixel intensity. The input/output pixel intensity graph of FIG. 5A outputs a linearly proportional brighter output pixel (up to a maximum intensity) for each input pixel. The pixel intensity multiplier is defined as the transform line's slope. The transform can be defined mathematically using the equation:

Output_Intensity=(slope*Input_Intensity)

Wherein Minimum<=Output_Intensity<=Maximum

Figure 5B:
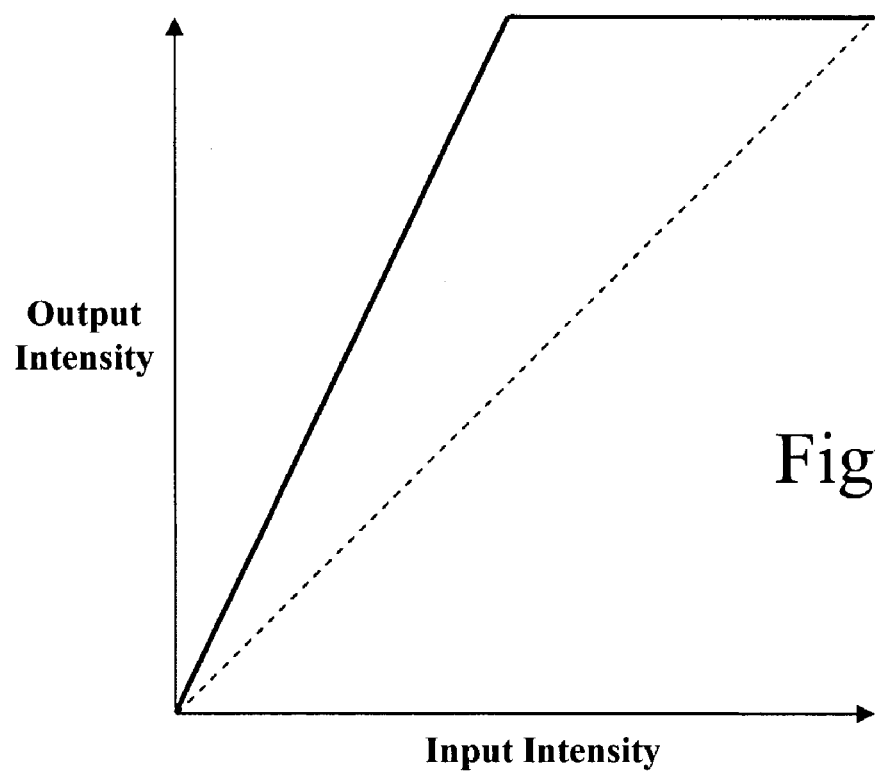
FIG. 5B illustrates a second example of a first embodiment that outputs an output pixel having linearly proportional intensity for each input pixel.

If the slope (the pixel intensity multiplier) is increased, the pixel intensity transform graph will appear as illustrated in the input/output pixel intensity graph of FIG. 5B.

Note that the slope can be modified to lower the intensity instead of raising the intensity. The raising or lowering of the pixel intensity may depend on whether the image contains black text on a white background or white text on a black background. If there is black text on a white background, then the slope will likely be less than one. If there is white text on a black background, then the slope will likely be greater than one.

Full-Contrast Single Threshold Implementation

Figure 6A:
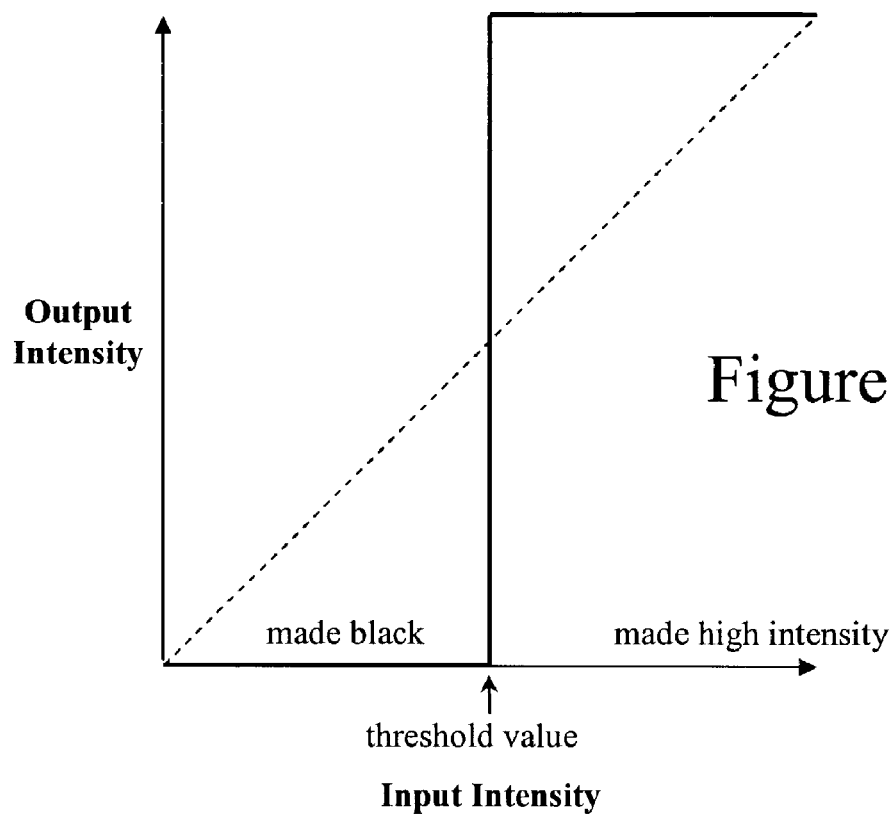
FIG. 6A illustrates a first single threshold embodiment that outputs a very low intensity pixel or very high intensity output pixel for each input pixel.

A second embodiment of the present invention employs a threshold mode with a single threshold. FIG. 6A illustrates a first example of a single threshold embodiment that outputs a very low intensity pixel or very high intensity output pixel for each input pixel. Specifically, the input/output pixel intensity graph of FIG. 6A shows that the system would boost the output pixel to full intensity (or another high intensity value) if an input pixel is above the threshold intensity level, and if an input pixel were below the threshold intensity then the system diminishes the intensity of the output pixel to zero (or another selected low intensity value).

High-Contrast Threshold Multiplication Implementation

Figure 6B:
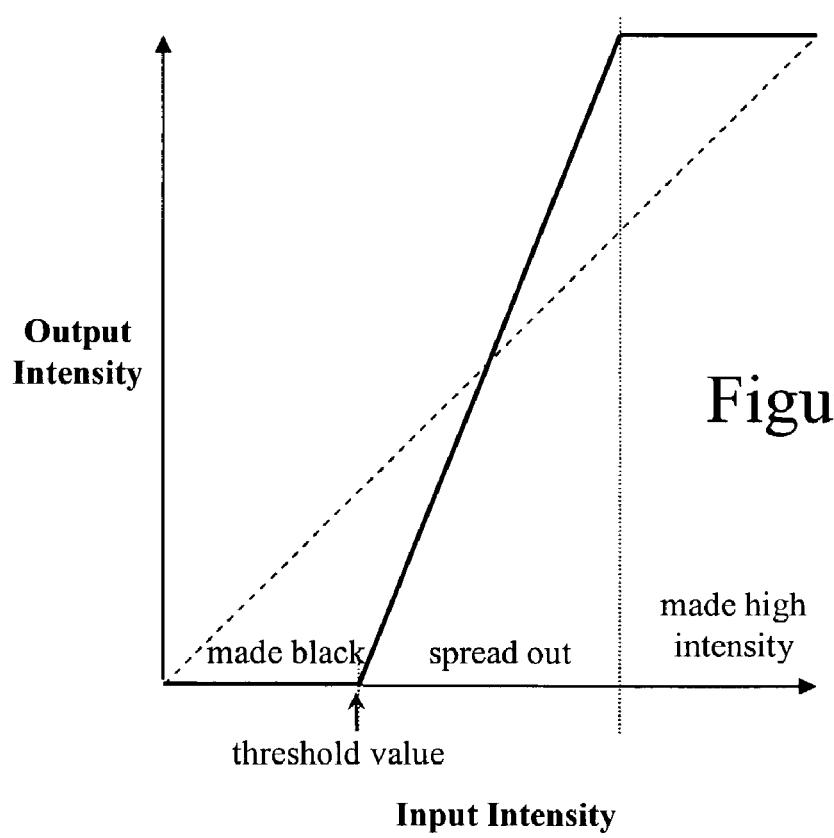
FIG. 6B illustrates a second single threshold embodiment that outputs a very low intensity output pixel for each low intensity input pixel and linearly increases the intensity of the remaining pixels.

A third embodiment is similar to the single threshold embodiment of FIG. 6A but also employs the pixel intensity multiplication of the first embodiment of FIG. 5A. Specifically, FIG. 6B illustrates a single threshold embodiment that outputs a very low intensity output pixel for each low intensity input pixel below the threshold intensity and linearly increases the intensity of the remaining input pixels (up to a maximum intensity). In such an embodiment, input pixels with middle intensity values are increased.

Threshold with Intensity Multiplication Implementation

Figure 7A:
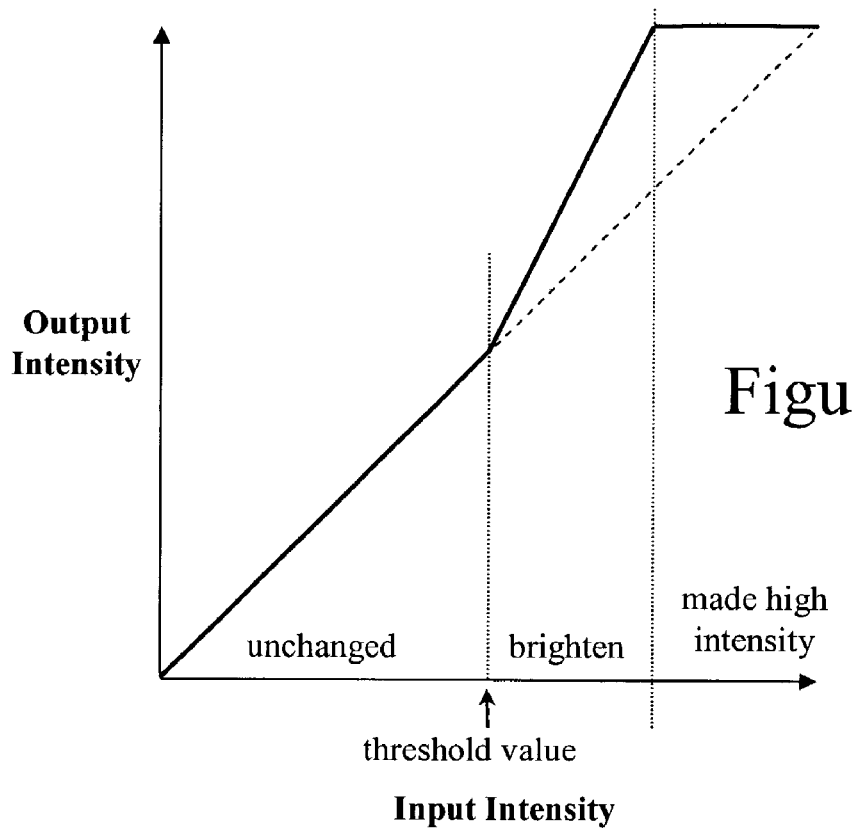
FIG. 7A illustrates a first example of another single threshold embodiment that outputs an output pixel having a linearly proportional intensity for each input pixel above the threshold.

A fourth embodiment is also a hybrid of the first two embodiments that combines a single threshold with intensity multiplication. FIG. 7A illustrates an input/output pixel intensity graph of a first example of another single threshold embodiment that outputs an output pixel having a linearly proportional intensity for each input pixel above the threshold intensity. All of the input pixels below the threshold intensity remain unchanged. In such an embodiment, only the higher intensity input pixels are affected.

Figure 7B:
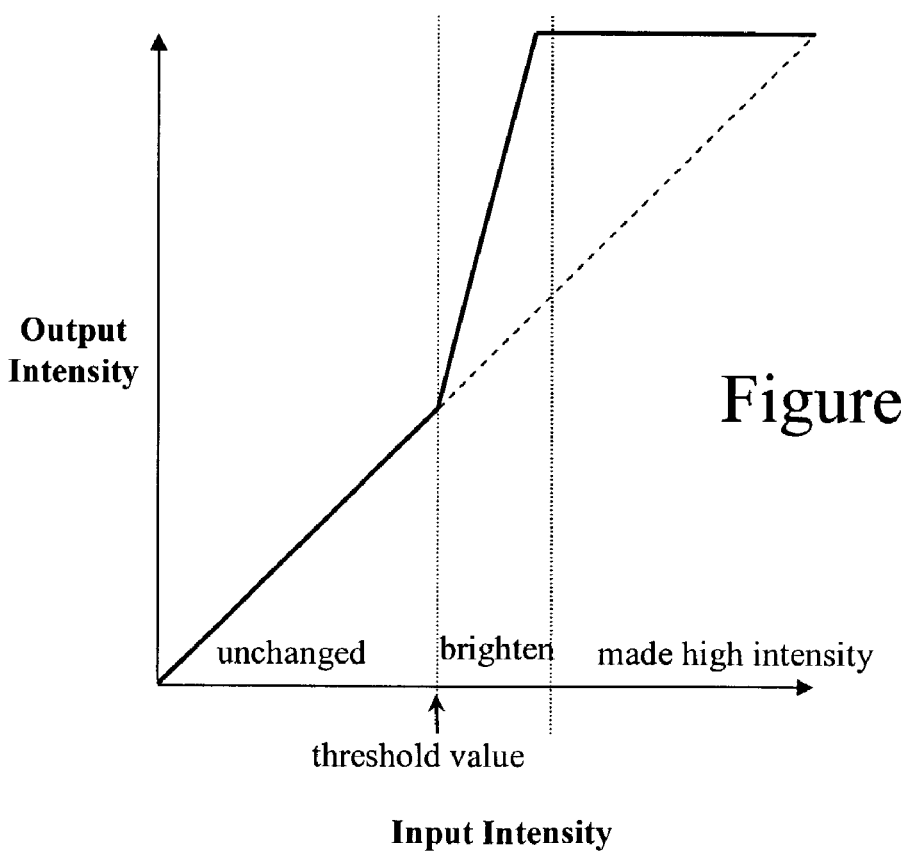
FIG. 7B illustrates a second example of another single threshold embodiment that outputs an output pixel having a linearly proportional intensity for each input pixel above the threshold.

In the single threshold with intensity multiplication embodiment of FIG. 7A, both the threshold intensity and the intensity multiplier may be user-defined. For example, FIG. 7B illustrates an input/output pixel intensity graph of a second example single threshold embodiment with intensity multiplication. In the example of FIG. 7B, the system has a lower threshold intensity value and a higher intensity multiplier than the system of FIG. 7A.

Full-Contrast with Dual Thresholds Implementation

A fifth embodiment employs two different pixel intensity thresholds. The first intensity threshold would force all input pixels with a lower intensity value than the threshold to zero intensity. The second intensity threshold value would force all input pixels with a higher intensity to a maximum intensity value. The remaining input pixels that are above the first intensity threshold and below the second intensity threshold would not be changed by the enhancement system.

Figure 8A:
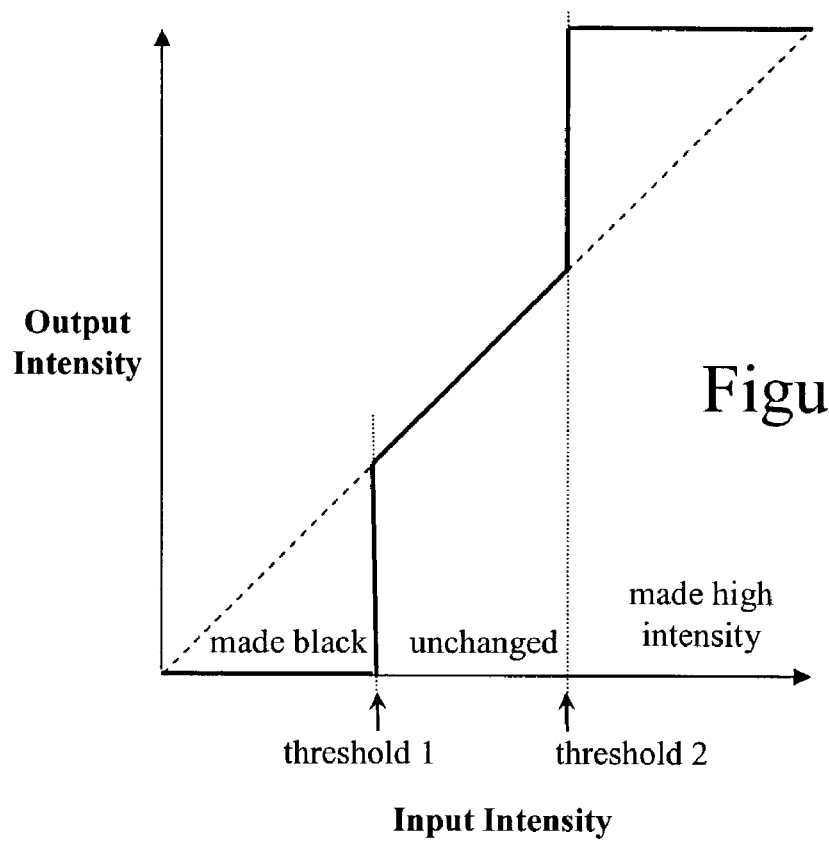
FIG. 8A illustrates a first example of a dual threshold embodiment that outputs a very low intensity output pixel for each input pixel below a first threshold and a very high intensity pixel for each input pixel above a second threshold and does not change the remaining input pixels.

FIG. 8A illustrates an input/output pixel intensity graph of first example of a dual threshold embodiment. As illustrated in FIG. 8A, the system outputs a very low intensity output pixel for each input pixel below the first intensity threshold and a very high intensity pixel for each input pixel above the second intensity threshold. The remaining pixels that fall between the two intensity thresholds are not changed.

Figure 8B:
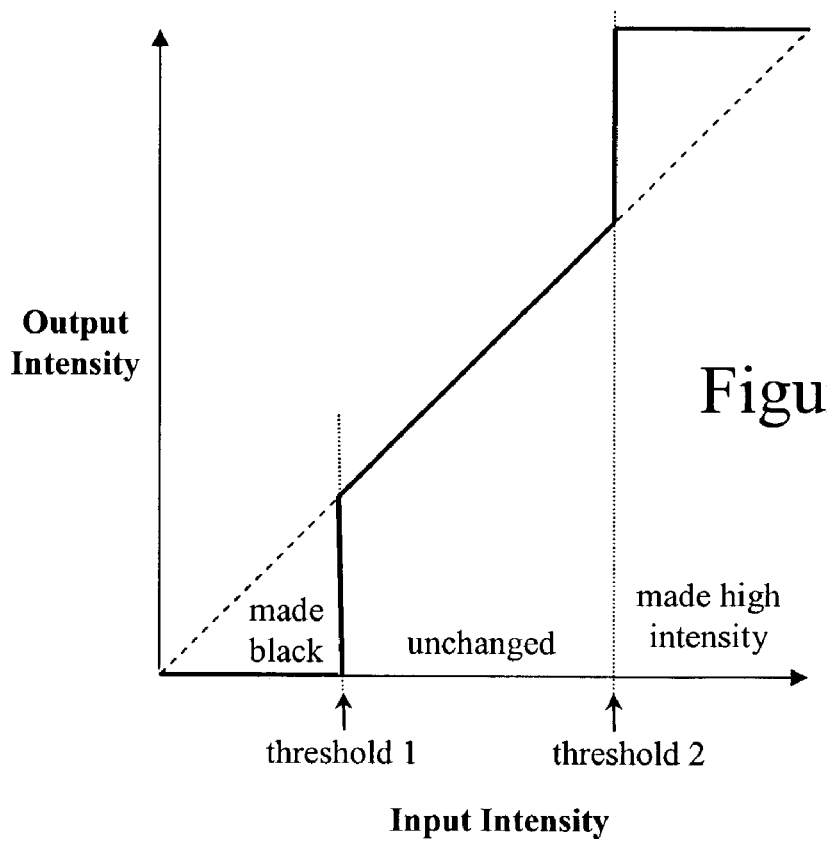
FIG. 8B illustrates a second example of a dual threshold embodiment that outputs a very low intensity output pixel for each input pixel below a first threshold and a very high intensity pixel for each input pixel above a second threshold and does not change the remaining input pixels.

FIG. 8B illustrates an input/output pixel intensity graph of a second example of a dual threshold embodiment. In the embodiment of FIG. 8B, the first threshold has been lowered and the second threshold has been raised such that a greater number of pixels are unchanged. In such an embodiment, the other parts of the image will be less affected by the text enhancement.

In another embodiment, an image analysis system may be used to identify which sections of a graphic image contain image data and which sections of the graphic image contain text data. In such an embodiment, the enhancement unit could be configured such that a display image made up of text data and non-text (image) data could be processed with little or no affect on the non-text (image) sections of the graphic image data.

Multiple Threshold Implementation

In a sixth embodiment of the present invention, the text enhancement system can incorporate the use of multiple pixel intensity thresholds. The first threshold would cause all input pixels with a lower intensity to be set to a minimum (possibly zero) intensity value. A final intensity threshold would cause all input pixels with a higher intensity to be set to a maximum intensity value. The remaining threshold values would divide the rest of the input pixels into various input pixel groups wherein each pixel in the same group would receive the same output pixel intensity value. This embodiment would address multilevel or aliased text.

Figure 9A:
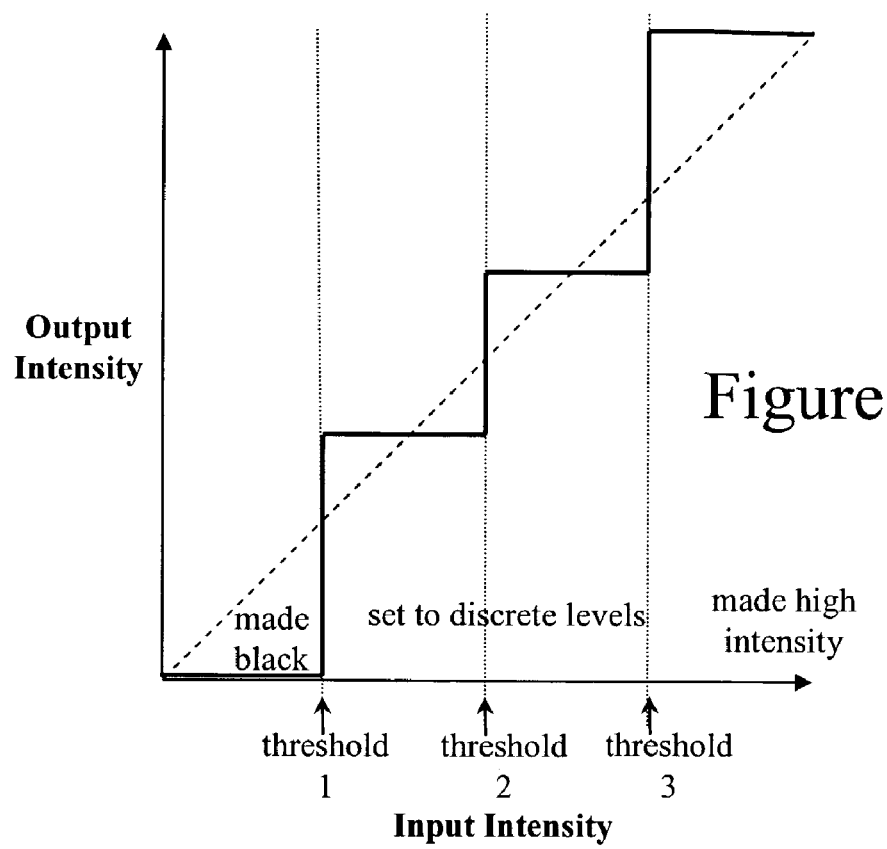
FIG. 9A illustrates a first example of a multiple threshold embodiment that outputs a very low intensity output pixel for each input pixel having an intensity below a first threshold, outputs pixels of various discrete intensities for input pixels of various intensity ranges, and a very high intensity pixel for each input pixel having an intensity above a highest threshold.

FIG. 9A illustrates an input/output pixel intensity graph of a first example of a multiple threshold embodiment. As illustrated in FIG. 9A, all input pixels with a lower intensity than Threshold 1 are output with a minimum (possibly zero) intensity value and all input pixels with an intensity greater than Threshold 3 are output with a maximum intensity value. The remaining pixels are then output with various discrete intensity values depending on the middle threshold values. As illustrated in FIG. 9A, all the remaining pixels below Threshold 2 are given a first discrete output intensity and all the remaining pixels above Threshold 2 are given a second discrete output intensity.

Figure 9B:
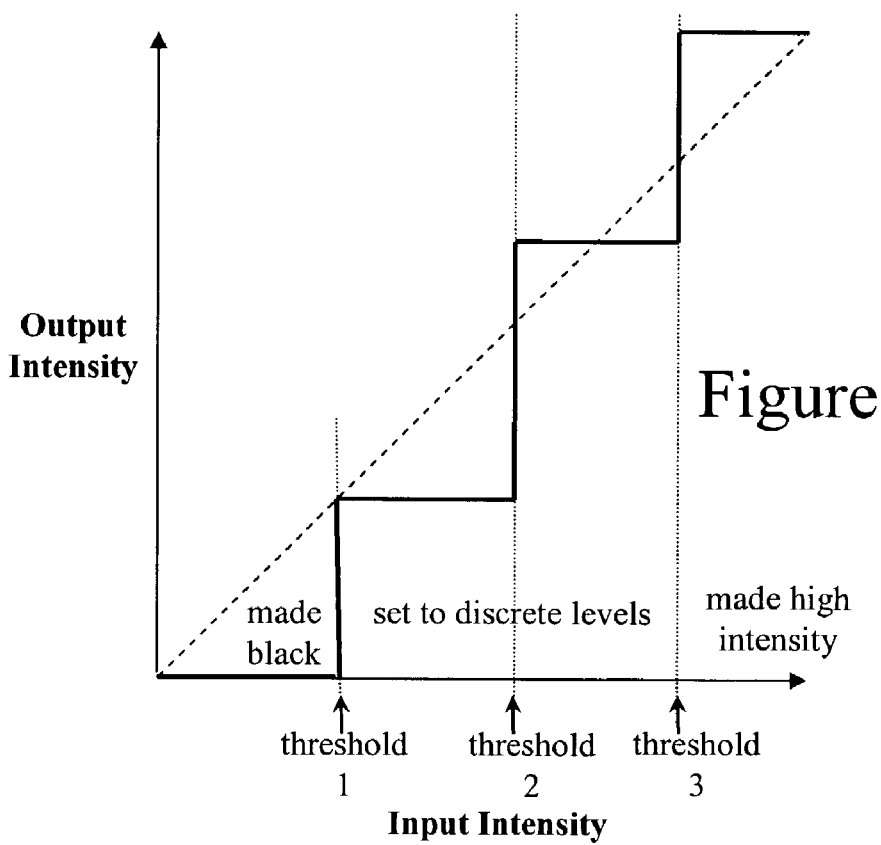
FIG. 9B illustrates a second example of a multiple threshold embodiment that outputs a very low intensity output pixel for each input pixel having an intensity below a first threshold, outputs pixels of various discrete intensities for input pixels of various intensity ranges, and a very high intensity pixel for each input pixel having an intensity above a highest threshold.

As with the other embodiments, the threshold values may all be programmable. Furthermore, in this embodiment, the discrete output levels may also be programmable. FIG. 9B illustrates an input/output pixel intensity graph of a second example of a multiple threshold embodiment that has different threshold values and discrete output intensities than the implementation of FIG. 9A.

Text Enhancement Unit Implementation

The text enhancement system may be implemented in a number of different manners. In a primitive implementation, the text enhancement system may be implemented as software within display drivers for a computer system. However, in a more sophisticated embodiment, the present invention may be implemented as digital electronic logic in hardware, which could be part of an application-specific-integrated-circuit (ASIC) that is used to format a digital picture for a computer display device or for display on a television.

In one embodiment, the enhancement unit may be controlled by a user selection to process all incoming graphical image data in enhancement mode. In a second embodiment additional logic is added to selectively enhance the data based on characteristics of the data itself to create the final display data. A number of different systems that analyze graphic image data to determine if the graphic image data contains text may be used for this purpose.

Figure 10:
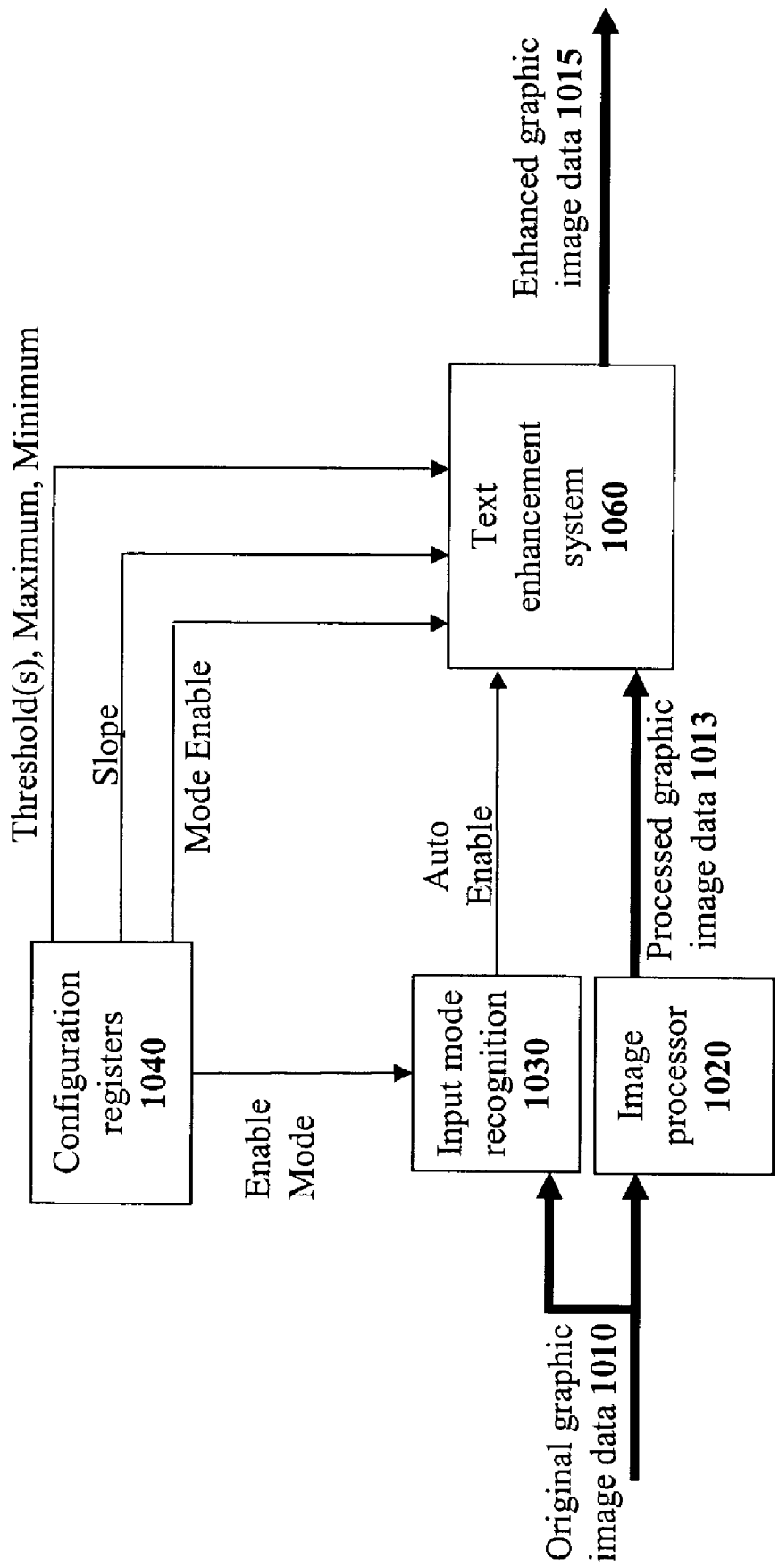
FIG. 10 illustrates a block diagram of one embodiment of the text enhancement system of the present invention.

FIG. 10 illustrates a block diagram of one embodiment of the text enhancement system. In the block diagram of FIG. 10 the original incoming graphic image data 1010 enters from the left. An image processor 1020 (such as a scaler, de-interlacer, or DSP) reformats the incoming digital graphical text data to produce processed graphic image data 1013.

Since the processed graphic image data 1013, may contain artifacts that reduce the legibility of text, the present invention adds the text enhancement system 1060 to enhance the text in the graphic image data. The text enhancement system 1060 adjusts the pixels of the processed graphic image data 1013 according to various transformations set forth in the previous section.

To control the text enhancement system 1060, the system includes a set of configuration registers 1040. The configuration registers 1040 include registers for specifying the single or dual pixel intensity thresholds. For implementations that perform pixel intensity multiplications, the configuration registers 1040 include a slop register for storing the pixel intensity multiplier. The configuration registers 1040 may also include minimum and maximum intensity values that limit the intensity output. The thresholds, slopes, minimum and maximum intensity values may all be user-programmable values such that the operation of the text enhancement system may be adjusted at any time. In a simplified implementation of the text enhancement system, these values may be eliminated or fixed into constant values.

The configuration registers 1040 may include one or more registers that specify in which mode the text enhancement system 1060 will operate. The mode register may specify if the text enhancement system 1060 is off, on, or in an automatic mode. In the automatic mode, an input mode recognition unit 1030 attempts to determine if text enhancement is required. When the input mode recognition unit 1030 determines that text enhancement is required, the input mode recognition unit 1030 activates the text enhancement system 1060 with an auto enable signal.

In addition to determining whether the text enhancement system 1060 is activated, the mode registers can specify how the text enhancement system 1060 will operate. Specifically, the mode register may specify which of the enhancement modes described in the previous section will be applied.

Thus, assuming the mode register settings specify that the text enhancement system 1060 is activated, the text enhancement system 1060 then processes the processed graphic image data 1013 to create enhanced graphic image data 1015. If the mode registers specify that the text enhancement system 1060 is not activated or the mode registers specify the automatic mode and the input mode recognition unit 1030 determines that no text enhancement is required, then the text enhancement system 1060 will simply allow the processed graphic image data 1013 to pass through unmodified.

The foregoing has described a text enhancer system. It is contemplated that changes and modifications may be made by one of ordinary skill in the art, to the materials and arrangements of elements of the present invention without departing from the scope of the invention.

We claim:

1. A method of enhancing graphical image data to improve text information, said method comprising:

processing graphical image data containing said text information in an image processing unit to form processed graphical image data for screen display, wherein the processing leads to changes in intensities of pixels of at least some of the characters of said text information;

transmitting said processed graphical image data to a text enhancement unit disposed between said image processing unit and said screen display;

applying a pixel intensity transform operation to said processed graphical image data, the pixel intensity transform operation including changing the intensities of pixels of the at least some of the characters of said text information to increase the intensity of pixels for characters of higher intensity, to decrease the intensity of pixels of characters of lower intensity, or both; and storing the processed graphical image data following the application of the intensity transform operation to be available for displaying.

2. The method as claimed in claim 1 wherein applying said pixel intensity transform comprises:

performing a pixel intensity multiplication for each of the pixels constituting said processed graphical image data; and forming enhanced pixels of enhanced graphical image data from said pixels, wherein each of said enhanced pixels is formed independent of any other pixel.

3. The method as claimed in claim 2 wherein said pixel intensity transform produces output pixels between a maximum pixel intensity value and a minimum pixel intensity value.

4. The method as claimed in claim 2 wherein said pixel intensity multiplication uses a pixel intensity multiplier value.

5. The method as claimed in claim 4 wherein said pixel intensity multiplier value is programmable.

6. The method as claimed in claim 2 wherein performing said pixel intensity multiplication further comprises:
    detecting an intensity value for each of said pixels constituting said processed graphical image data that passes an intensity threshold;
    selecting a multiplier value associated with said intensity value; and
    multiplying said intensity value with said multiplier value.

7. The method as claimed in claim 1 wherein said pixel intensity transform comprises a threshold operation that outputs a low pixel intensity for an input pixel with an input pixel intensity below a pixel intensity threshold and outputs a high pixel intensity for an input pixel with an input pixel intensity above said pixel intensity threshold.

8. The method as claimed in claim 7 wherein said pixel intensity threshold is programmable.

9. The method as claimed in claim 1 wherein said pixel intensity transform comprises a threshold operation that outputs a low pixel intensity for an input pixel with an input pixel intensity below a pixel intensity threshold and outputs a high pixel intensity for an input pixel with an input pixel intensity above said pixel intensity threshold, wherein said high pixel intensity is formed by multiplying said input pixel by a pixel intensity multiplier.

10. The method as claimed in claim 9 wherein said pixel intensity threshold is programmable.

11. The method as claimed in claim 1 wherein said pixel intensity transform comprises a threshold operation that outputs an unchanged input pixel for an input pixel with an input pixel intensity below a pixel intensity threshold and outputs a high pixel intensity for an input pixel with an input pixel intensity above said pixel intensity threshold, wherein said high pixel intensity is formed by multiplying said input pixel by a pixel intensity multiplier.

12. The method as claimed in claim 11 wherein said pixel intensity threshold is programmable.

13. The method as claimed in claim 11 wherein output from said pixel intensity transform operation is limited between a maximum pixel intensity value and a minimum pixel intensity value.

14. The method as claimed in claim 1 wherein said pixel intensity transform operation comprises a threshold operation that outputs a low pixel intensity for an input pixel with an input pixel intensity below a first pixel intensity threshold and outputs a high pixel intensity for an input pixel with an input pixel intensity above a second pixel intensity threshold.

15. The method as claimed in claim 14 wherein said first pixel intensity threshold and said second pixel intensity threshold are programmable.

16. The method as claimed in claim 14 wherein said pixel intensity transform outputs input pixels with an input pixel intensity above said first pixel intensity threshold and below said second pixel intensity threshold unchanged.

17. The method as claimed in claim 1 wherein said pixel intensity transform comprises a threshold operation that outputs a low pixel intensity for an input pixel with an input pixel intensity below a low pixel intensity threshold and outputs a high pixel intensity for an input pixel with an input pixel intensity above a high pixel intensity threshold, and outputs a pixel intensity with a discrete intensity value for an input pixel intensity above said low pixel intensity threshold and below said high pixel intensity threshold.

18. The method as claimed in claim 17 wherein said pixel with a discrete intensity value comprises a first discrete intensity for an input pixel with an input pixel intensity above a third intensity threshold and a second discrete intensity for an input pixel with an input pixel intensity below said third intensity threshold.

19. The method of claim 1, further comprising activating the pixel intensity transform operation automatically.

20. The method of claim 19, further comprising determining if text enhancement is required using an input mode recognition unit, and, if text enhancement is required, providing an enable signal for the pixel intensity transform operation.

21. A method of enhancing graphical image data to improve text information, said method comprising:
    processing graphical image data containing said text information in an image processing unit to form processed graphical image data for screen display with text quality that is degraded;
    applying said processed graphical image data to a text enhancement unit that applies a pixel intensity transform operation to said processed graphical image data to improve said text quality;
    storing the processed graphical image data following the application of the intensity transform operation to be available for displaying;
    wherein said pixel intensity transform comprises:
        a threshold operation that outputs a low pixel intensity for an input pixel with an input pixel intensity below a low pixel intensity threshold and outputs a high pixel intensity for an input pixel with an input pixel intensity above a high pixel intensity threshold, and outputs a pixel intensity with a discrete intensity value for an input pixel intensity above said low pixel intensity threshold and below said high pixel intensity threshold,
    wherein said pixel with a discrete intensity value comprises:
        a first discrete intensity for an input pixel with an input pixel intensity above a third intensity threshold and
        a second discrete intensity for an input pixel with an input pixel intensity below said third intensity threshold.

22. A system comprising:
    a video display;
    an image processing unit to process graphical image data containing text information to form processed graphical image data for display on the video display, wherein the processing leads to changes in intensities of pixels in at least some of characters of the text information; and
    a text enhancement unit to apply a pixel intensity transform operation to the processed graphical image data, the pixel enhancement transform operation including changing the intensities of the pixels of the at least some of the characters of text information to increase the intensity of pixels for characters that have been reduced in intensity by the processing, to decrease the intensity of pixels of characters that have been increased in intensity by the processing, or both, wherein the text enhancement unit is between the image processing unit and the display; and a memory for storing the processed graphical image data following the application of the intensity transform operation.

23. The system of claim 22, wherein the image processing unit is physically separate from the text enhancement unit.

24. The system of claim 22, wherein applying said pixel intensity transform comprises:

performing a pixel intensity multiplication for each of the pixels constituting said processed graphical image data; and forming enhanced pixels of enhanced graphical image data from said pixels, wherein each of said enhanced pixels is formed independent of any other pixel.

25. The system of claim 22, wherein said pixel intensity transform comprises a threshold operation that outputs a low pixel intensity for an input pixel with an input pixel intensity below a pixel intensity threshold and outputs a high pixel intensity for an input pixel with an input pixel intensity above said pixel intensity threshold, wherein said high pixel intensity is formed by multiplying said input pixel by a pixel intensity multiplier.

26. The system of claim 25, wherein said pixel intensity threshold is programmable.

27. The system of claim 22, wherein said pixel intensity transform comprises a threshold operation that outputs an unchanged input pixel for an input pixel with an input pixel intensity below a pixel intensity threshold and outputs a high pixel intensity for an input pixel with an input pixel intensity above said pixel intensity threshold, wherein said high pixel intensity is formed by multiplying said input pixel by a pixel intensity multiplier.

28. The system of claim 22, wherein said pixel intensity transform comprises a threshold operation that outputs a low pixel intensity for an input pixel with an input pixel intensity below a low pixel intensity threshold and outputs a high pixel intensity for an input pixel with an input pixel intensity above a high pixel intensity threshold, and outputs a pixel intensity with a discrete intensity value for an input pixel intensity above said low pixel intensity threshold and below said high pixel intensity threshold.

29. The system of claim 28, wherein said pixel intensity with a discrete intensity value comprises a first discrete intensity for an input pixel with an input pixel intensity above a third intensity threshold and a second discrete intensity for an input pixel with an input pixel intensity below said third intensity threshold.

30. The system of claim 22, further comprising an input mode recognition unit coupled with the text enhancement unit, the input mode recognition unit configured to determine if text enhancement is needed.

31. The system of claim 30, wherein the input mode recognition unit is further configured to send an enable signal to the text enhancement unit if the input mode recognition unit determines that text enhancement is needed.

* * * * *